United States Patent [19]

Steele

[11] Patent Number: 5,238,094

[45] Date of Patent: Aug. 24, 1993

[54] ENCLOSED CLUTCH ASSEMBLY TO REDUCE NOISE

[75] Inventor: Duane F. Steele, Onsted, Mich.

[73] Assignee: Ford Motor Company, Dearborn, Mich.

[21] Appl. No.: 1,592

[22] Filed: Jan. 7, 1993

[51] Int. Cl.[5] ............................................. F16D 27/10
[52] U.S. Cl. ................................. 192/84 C; 192/84 B; 192/110 R
[58] Field of Search ............... 192/84 C, 84 B, 110 R, 192/90, 40

[56] References Cited

U.S. PATENT DOCUMENTS

| | | | |
|---|---|---|---|
| 3,269,200 | 8/1966 | Vaughn et al. | 74/230.17 |
| 3,415,347 | 12/1968 | Wrensch | 192/84 |
| 3,675,747 | 7/1972 | Obermark | 192/48.2 |
| 3,703,227 | 11/1972 | Murakami et al. | 192/110 R X |
| 3,743,068 | 7/1973 | Westervelt et al. | 192/84 |
| 4,445,606 | 5/1984 | Van Laningham | 192/84 C X |
| 4,488,627 | 12/1984 | Streich et al. | 192/48.2 |
| 4,566,574 | 1/1986 | Marshall | 192/84 |
| 4,718,526 | 1/1988 | Koitabashi | 192/35 |
| 4,909,369 | 3/1990 | Bausch | 192/84 |
| 5,119,915 | 6/1992 | Nelson | 192/84 C X |
| 5,137,132 | 8/1992 | Cerny | 192/84 C |
| 5,199,541 | 4/1993 | Tobyama et al. | 192/84 C |

FOREIGN PATENT DOCUMENTS

| | | |
|---|---|---|
| 702470 | 1/1965 | Canada . |
| 0065923 | 12/1982 | European Pat. Off. . |
| 1319912 | 1/1963 | France . |
| 1322039 | 2/1963 | France . |
| 55-119228 | 9/1980 | Japan . |
| 57-22423 | 2/1982 | Japan . |
| 57-43029 | 3/1982 | Japan . |
| 57-204331 | 12/1982 | Japan . |
| 59-47538 | 3/1984 | Japan . |
| 59-115494 | 7/1984 | Japan . |
| 59-226721 | 12/1984 | Japan . |

Primary Examiner—Leslie A. Braun
Assistant Examiner—Andrea Pitts
Attorney, Agent, or Firm—Roger L. May; Raymond L. Coppiellie

[57] ABSTRACT

A pulley driven rotor shaft and electromagnetic clutch assembly for a refrigerant gas compressor having a stationary housing enclosing compressor pumping elements includes a housing extension that forms a pulley bearing support, the hub of the pulley forming a main bearing support for the rotor shaft, the pulley being connected drivably to a clutch engagement plate and a clutch friction plate drivably connected to the rotor shaft, the housing extension enclosing the clutch engagement plate and electromagnetic clutch elements including the friction clutch plate thereby reducing clutch engagement noise.

4 Claims, 2 Drawing Sheets

ENCLOSED CLUTCH ASSEMBLY TO REDUCE NOISE

TECHNICAL FIELD

My invention relates to a refrigerant gas compressor for an air conditioning system wherein the compressor rotor is connected drivably to a pulley drive that is activated and deactivated by an electromagnetic clutch mounted on the compressor housing.

BACKGROUND OF THE INVENTION

My invention comprises improvements in electromagnetic clutch and pulley assemblies for a refrigerant gas compressor adapted especially for use with an air conditioning system for automotive vehicles wherein the compressor is drivably connected to the vehicle engine crankshaft with a pulley drive. In an arrangement of this kind, it is common practice to mount a driven pulley on a stationary nose or sleeve journal support that forms a part of the housing or that is connected with threaded fasteners to the housing. A driveshaft for the compressor rotor in such conventional arrangements is journalled within the journal support.

An electromagnetic clutch for controlling torque distribution from the driven pulley to the rotor includes a fixed coil winding and a core that establishes an electromagnetic flux flow path through a clutch friction member. A clutch engagement plate is disposed adjacent the friction member and is connected to the driveshaft for the rotor. A typical arrangement of this kind is shown in U.S. Pat. No. 4,718,526.

Another prior art clutch and pulley bearing arrangement is shown in U.S. Pat. No. 3,415,347. This includes a driven pulley for the compressor shaft that is journalled on the driveshaft. The rotor in turn is journalled within the stationary nose or extension of the fixed housing for the compressor. An electromagnetic clutch friction member is connected to and supported by the driveshaft. A clutch engagement plate is resiliently connected to the pulley, unlike the arrangement in U.S. Pat. No. 4,718,526 where the engagement plate for the electromagnetic clutch is connected drivably to the rotor of the compressor.

In prior art constructions such as those described in the '347 and in the '526 patents, the clutch engagement plate, upon actuation of the electromagnetic clutch, engages the friction plate of the electromagnetic clutch and causes an undesirable noise that is audible in the passenger compartment of the vehicle. There is no acoustic barrier for the clutch components in the engine compartment of the vehicle.

BRIEF DESCRIPTION OF THE INVENTION

I have provided an improved bearing and clutch arrangement for a pulley driven air conditioning refrigerant gas compressor for an automotive vehicle. It includes a housing adapted to be located within the engine compartment of the vehicle and a cup-shaped enclosure that forms a part of the compressor housing. The enclosure surrounds an electromagnetic clutch coil, an electromagnetic clutch friction plate and an electromagnetic clutch engagement plate. An extension on the cup-shaped enclosure forms a journal for the drive pulley for the rotor driveshaft of the compressor.

The pulley has a hub to which the clutch engagement plate is connected so that the engagement plate, as in the case of the '347 patent reference, rotates with the pulley. The shaft for the rotor is journalled on the pulley hub, which permits a radial disposition of the pulley bearing with respect to the driveshaft bearing, thus reducing axial length of the overall compressor assembly.

The cup-shaped enclosure that forms a part of the housing isolates the clutch components and contributes substantially to quieter operation of the clutch as the clutch is engaged and disengaged by automatic air conditioning controls for the refrigerant gas flow system.

PARTICULAR DESCRIPTION OF THE INVENTION

Figure 1:
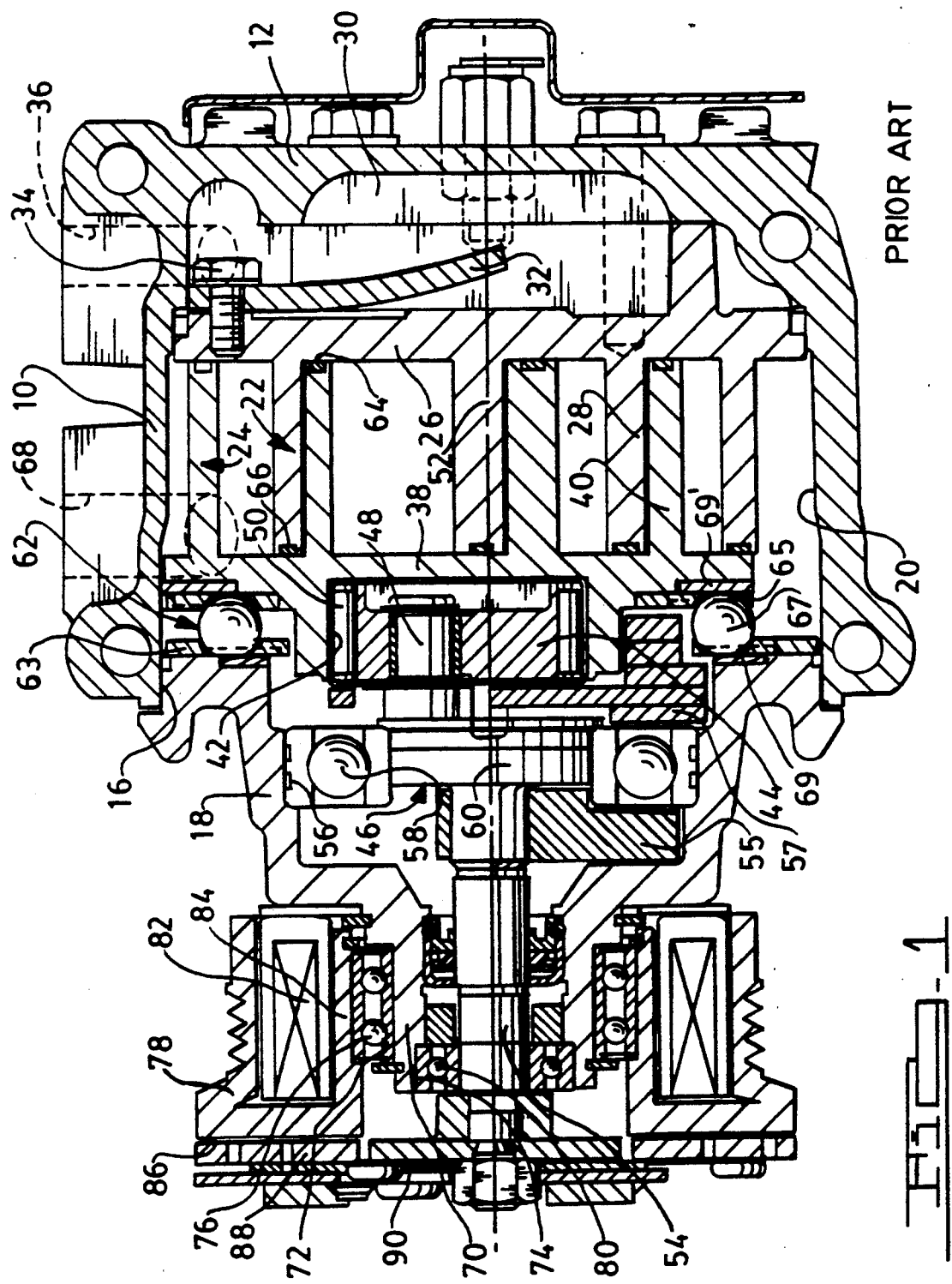
FIG. 1 shows a prior art compressor design with a conventional drive pulley and electromagnetic clutch bearing assembly.

For the purpose of disclosing a structural environment for the improvements of my invention, I will describe here the prior art design of FIG. 1.

The compressor of FIG. 1 comprises a cast aluminum housing 10 having a generally cylindrical shape and a closed end portion 12. The housing 10 is open, as shown at 16. A bearing support end plate 18 is received within the opening 16 and is held in place by suitable fastening means, not illustrated.

A pair of scrolls is disposed in the interior compressor cavity 20. This includes a fixed scroll 22 and a relatively movable scroll 24. Fixed scroll 22 includes a scroll disc portion 26 and a refrigerant pumping portion 28 that comprises multiple wraps with surfaces that conform to the shape of an involute of a circle. A discharge port (not shown in FIG. 1) is located generally on the axis of the fixed scroll 22. That port communicates with a high pressure refrigerant pressure chamber 30 located between disc portion 26 and the end portion 12 of the housing 10.

A movable valve element 32, secured to the scroll disc portion 26, is adapted normally to close the high pressure port. It is a flexible valve element that is anchored by a retainer bolt 34 secured to the scroll disc portion 26. Valve element 32 functions as a one-way flow valve that becomes unseated when the pressure in the pumping chambers of the scrolls reaches the discharge pressure in chamber 30. A pressure distributor port, shown with phantom lines at 36, communicates with the pressure chamber 30.

The movable scroll 24 comprises end disc portion 38 and pumping portion 40. The pumping portion 40 comprises multiple involute wraps that are nested with the wraps of the fixed scroll 22. As in the case of the fixed scroll 22, the wraps of the movable scroll 40 are shaped in the form of an involute of a circle. The involute surfaces of the fixed scroll contact involute surfaces of the movable scroll at tangent points. A pair of pumping chambers is defined by the registering wraps of the scrolls, the extent of the pumping chambers being defined by the locations of the tangent points.

A bearing pocket 42 in the scroll end disc portion 38 receives a coupling compliant disc portion 44 of anti-rotation ball coupling identified generally by reference character 46.

The ball coupling 46 includes a crank pin 48 journalled within the disc portion 44, the latter having a cylindrical outer surface that is journalled within the pocket 42 by means of roller bearings 50. The crank pin 48 is situated in offset relationship with respect to the axis of the fixed scroll, the axis being identified in FIG. 1 by reference numeral 52.

The coupling disc portion is provided with means, not shown, for effecting limited lost angular adjustment of the movable scroll relative to portion 44. This will facilitate passage of an occasional liquid slug of refrigerant through the compressor.

The crank portion 48 is connected drivably to compressor driveshaft 54, which is journalled in bearing opening 56 formed in plate 18. A journal for the shaft 54 includes ball bearing 58 having an inner race that registers with cylindrical bearing portion 60 carried by the driveshaft 54. A counterweight 55 is carried by crankshaft 54 at a location 180° displaced from crank portion 48. Another counterweight 57 is located in the opposite side of bearing 58.

For an understanding of the mode of operation of the scroll compressor illustrated in FIG. 1, reference may be made to my copending application Ser. No. 08/001600, filed Jan. 7, 1993, entitled "Scroll-Type Compressor Having Unidirectional Rotor", which is assigned to the assignee of my present invention.

An anti-rotation roller thrust bearing assembly 62 is disposed between the scroll disc portion 38 and the end plate 18. This axially positions the movable scroll and accommodates any axial thrust acting on the movable scroll. It also prevents relative angular movement of the scrolls as the movable scroll follows an orbital path. The ends of the wraps for the movable scroll are sealed with respect to the disc portion 26 of the fixed scroll by a running seal 64. Similarly, a seal 66 is located between the ends of the wraps of the fixed scroll and the adjacent surface of the disc portion 38 of the movable scroll.

Bearing 62 includes plate 63 fixed to the housing and plate 65 connected to the movable scroll. Balls 67, which are received in openings in plates 63 and 65, react against thrust rings 69 and 69' as they orbit in the openings. The motion of the movable scroll is not unlike the motion that would be generated by a well known Oldham coupling.

A suction pressure passage leading to the compression chambers defined by the scrolls is shown by means of dotted lines in FIG. 1 at 68.

In the conventional compressor design of FIG. 1, the end plate 18 carries a fixed sleeve or nose 70 having a machined outer cylindrical surface 72 and a machined inner cylindrical surface 74. Surface 72 is a mounting surface for the inner race of pulley bearing assembly 76 for a compressor driveshaft drive pulley 78. The nose 70 defines a sleeve that acts as a bearing support for the bearing 80 for driveshaft 54 and as a bearing support for the bearing 76.

Pulley 78 encloses electromagnetic coil windings 82 which surround the hub 84 of the pulley.

The pulley 78 includes a radial portion having a friction clutch surface 86 situated directly adjacent a friction clutch engagement plate 88. Driveshaft 54 is connected drivably to the engagement plate 88 through a drive spring arrangement 90.

It is necessary in the pulley and clutch assembly of FIG. 1 for precise machining operations to be made to locate properly the bearing seat for the shaft bearing 80 and for the pulley bearing 76. This precision machining operation must occur so that the bearing surfaces are formed to precise diametric limits and to precise concentricity, one with respect to the other.

Figure 2:
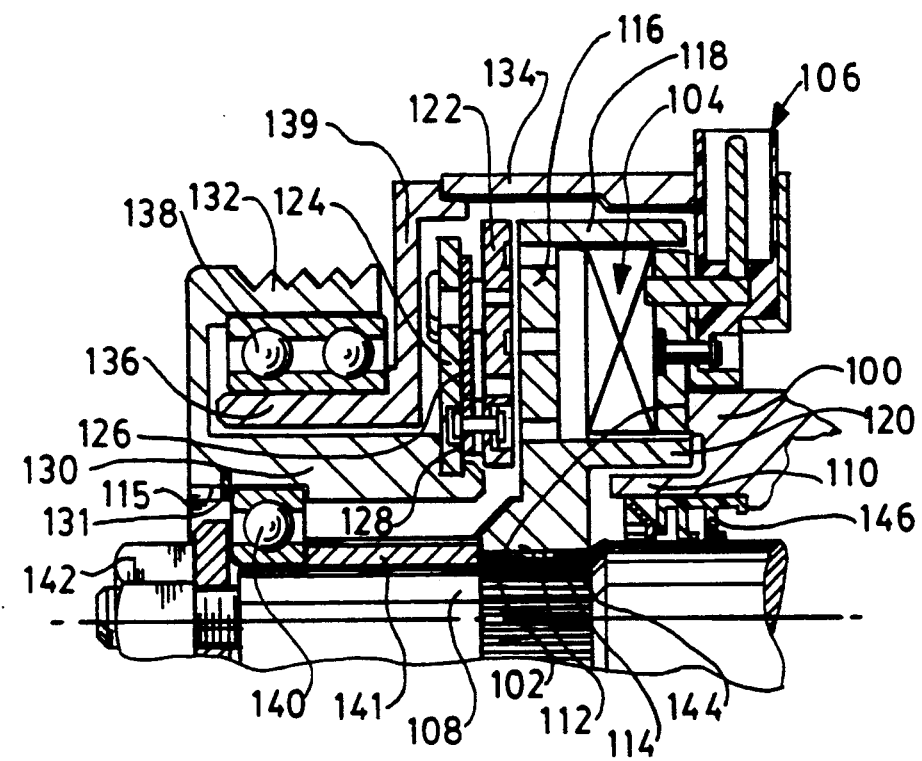
FIG. 2 is a cross-sectional view of the improved drive pulley and electromagnetic clutch assembly of my invention.

In FIG. 2, I have shown a first embodiment of the improvements of my invention. In the FIG. 2 construction, the housing for the compressor is shown at 100. It includes a mounting shoulder 102 for an electromagnetic clutch coil assembly identified generally by reference numeral 104. The coil assembly is secured to the shoulder 102 by means of fasteners (not shown). Coil terminal connections are generally identified by reference numeral 106 thereby permitting the coil to be connected to the vehicle voltage source.

The compressor includes a rotor driveshaft 108 which is received in stationary sleeve 110 of the housing 100. A clutch friction plate hub 112 is splined at 114 to the shaft 108. It carries drivably a clutch friction plate 116 which is joined at its outer periphery to clutch ring 118 surrounding the windings for coil 104. The core 120 for the electromagnetic clutch is connected to or is formed as part of the hub 112.

Clutch engagement plate 122 is situated directly adjacent friction plate 116. It is connected resiliently at 128 to the drive plate 124 by means of spring disk 126. Drive plate 124 is connected directly to the hub 130 of drive pulley 132.

The housing 100 is provided with an annular extension 134 which surrounds the drive plate 124, the engagement plate 122 and the electromagnetic clutch coil windings. A pulley journal sleeve 136 is joined to a closure disk 139, which is secured to the extension 134 and which cooperates with the extension 134 to form a cup-shaped enclosure for the entire electromagnetic clutch assembly.

The sleeve 136 is externally machined to provide a support for the inner race of a compound ball bearing assembly 138 for the pulley 132.

The outboard bearing for the shaft 108, which is identified by reference numeral 140, includes an inner race piloted on the outboard end of the shaft 108. It is received in a bearing pocket 115 formed in the hub 130 of the pulley 132.

A snap ring 131 holds the outer race for bearing 140 fast within the pocket 115.

A select fit spacer tube 141 surrounds the shaft 108 and extends from the inner race of the bearing 140 to the clutch hub 112. This controls the gap between the engagement plate 122 and the clutch friction plate 116.

A clamping nut 142, threadably received on the end of the shaft 108, retains bearing 140. The hub 112 and the other clutch components are held in fixed axially spaced stacked relationship as the hub 112 engages the locating shoulder 144 formed on the shaft 108.

The inboard end of the shaft 108 can be journalled within the housing as described in the prior art construction of FIG. 1.

A rotary shaft seal 146 is located between the inboard end of the shaft 108 and the interior of the housing extension 110 as indicated in FIG. 2.

Figure 3:
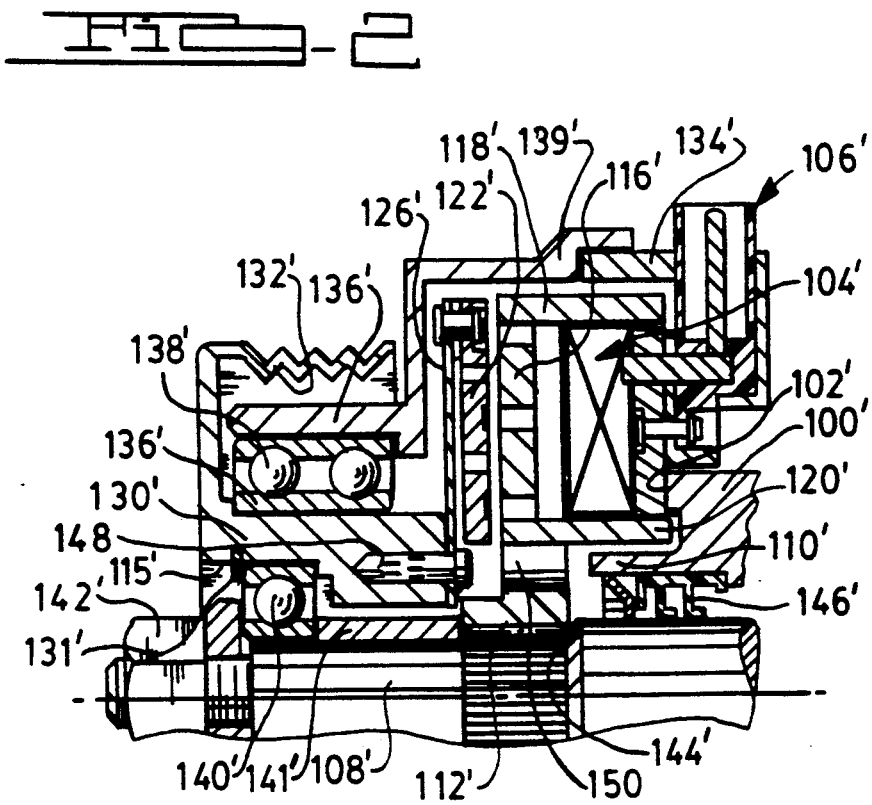
FIG. 3 is a cross-sectional view similar to the cross-sectional view of FIG. 1 showing an alternate embodiment of my invention.

In the alternate embodiment of FIG. 3, the pulley hub 130' is journalled by compound bearing assembly 138' on extension 136'. The extension 136' is formed with an internal bearing pocket for receiving the compound bearing assembly, unlike the design in FIG. 2 where the corresponding bearing assembly 138 is received in a bearing pocket formed in the pulley 132.

In the construction of FIG. 3, the elements that have counterpart elements in the FIG. 2 construction have been identified by similar reference characters although prime notations are added.

In the FIG. 3 construction, the flexible spring disk 126', which forms a driving connection between the hub 130' of the pulley 132' and engagement plate 122', is secured to the hub 130' by a fastener 148. The radially outward end of the flexible member 126' is secured to the outer periphery of the engagement plate 122' by rivets as shown.

The hub 112', as seen in FIG. 3, may be formed with balance or lightening holes 150. These provide design flexibility in balancing the rotating elements of the clutch and pulley assembly.

In the FIG. 3 construction, the extension 134' is shortened with respect to the corresponding extension 134 of the FIG. 2 construction. The extension 134' together with the extension 139' of the pulley journal, as in the construction of FIG. 2, defines a cup-shaped enclosure for the engagement plate. The friction plate and the clutch coil windings shown in FIG. 3 thereby isolate clutch engagement noise, which results in quieter operation.

Having described preferred embodiments of my invention, what I claim and desire to secure by United States Letters Patent is:

1. A pulley and electromagnetic clutch assembly for a refrigerant gas compressor having:
   a housing;
   an electromagnetic coil assembly secured to said housing;
   a compressor driveshaft within said housing and extending outward therefrom;
   a drive pulley having a hub, first bearing means for journalling an outboard end of said driveshaft on said pulley hub;
   a clutch friction plate connected drivably to said driveshaft and a clutch engagement plate disposed directly adjacent said friction plate, said engagement plate being resiliently connected to said pulley;
   a cup-shaped housing extension carried by said housing and enclosing said coil assembly, said friction plate and said engagement plate; and
   second bearing means for journalling said drive pulley on said housing extension.

2. The combination as set forth in claim 1 wherein said drive pulley is disposed at the outboard end of said driveshaft, said clutch friction plate and said clutch engagement plate being located between said housing and said drive pulley.

3. The combination as set forth in claim 1 wherein said clutch friction plate defines an electromagnetic flux flow path that envelops said engagement plate whereby said engagement plate and said clutch friction plate are adapted to be engaged frictionally as said coil assembly is energized, said housing providing acoustic isolation and effecting quiet clutch operation.

4. The combination as set forth in claim 2 wherein said clutch friction plate defines and electromagnetic flux flow path that envelops said engagement plate whereby said engagement plate and said clutch friction plate are adapted to be engaged frictionally as said coil assembly is energized, said housing providing acoustic isolation and effecting quiet clutch operation.

* * * * *